Aug. 14, 1962 J. W. HIGGINBOTHAM 3,049,627
ELECTRICAL TIMING CIRCUIT
Filed June 17, 1957 2 Sheets-Sheet 1

INVENTOR.
JOHN W. HIGGINBOTHAM
BY Julian C. Renfro
ATTORNEY

Aug. 14, 1962 J. W. HIGGINBOTHAM 3,049,627

ELECTRICAL TIMING CIRCUIT

Filed June 17, 1957 2 Sheets-Sheet 2

INVENTOR.
JOHN W. HIGGINBOTHAM
BY Julian C. Renfro
ATTORNEY

United States Patent Office 3,049,627
Patented Aug. 14, 1962

3,049,627

ELECTRICAL TIMING CIRCUIT

John W. Higginbotham, Essex, Md., assignor to Martin-Marietta Corporation, a corporation of Maryland Filed June 17, 1957, Ser. No. 666,136
3 Claims. (Cl. 307—88.5)

The present invention relates to a transistorized timing circuit, and more particularly to such a circuit characterized by great dependability, accuracy, and compactness.

The improved circuit of the invention comprises a resistor and a capacitor connected as a conventional R-C series circuit. A voltage source is connected across the series circuit to develop a potential at a first connection point in the series circuit between the resistor and capacitor. As is well known in the art this potential is due to the charging of the capacitor and varies in time in relation to the time constant of the R-C circuit. A preselected constant potential is also provided in the invention by means of a voltage divider network connected across the voltage source and series circuit. In this way the constant potential may be tapped off at a suitably located second connection point in the voltage divider network. The constant potential acts as a reference for the varying potential so that the voltage difference between the first and second connection points varies in accordance with the time constant of the R-C circuit.

The improved circuit of the invention also includes a switching amplifier comprising a transistor having base, emitter, and collector electrodes. The input circuit of the amplifier includes the base and emitter electrodes of the transistor and is connected between the first and second connection points to sense the varying voltage difference therebetween. The output circuit of the amplifier is connected to any load to be initiated into operation by the timing circuit. The transistor is connected within the input circuit to be reverse biased by the initial voltage difference across the two connection points. Thus the amplifier will normally be cut off and the load will remain inoperative. However, as the capacitor in the series circuit charges, the voltage difference across the input circuit continues to vary until a point is reached where the transistor becomes forward biased. At this time a current input is applied to the switching amplifier which produces an output current initiating the load into operation. Thus the timing circuit may be employed to initiate the operation of an output load after the elapse of a time interval determined by the time constant of the R-C circuit.

The improved timing circuit above described has no moving parts and is therefore rugged and reliable in operation. It remains accurate over wide temperature ranges and is unaffected by long-term variations in applied voltage. In addition, it is light, compact, and efficient in operation. Other advantageous features are the ease with which its time interval may be adjustably selected and its ability to be almost instantly reset after each time interval evaluation.

Figure 1:
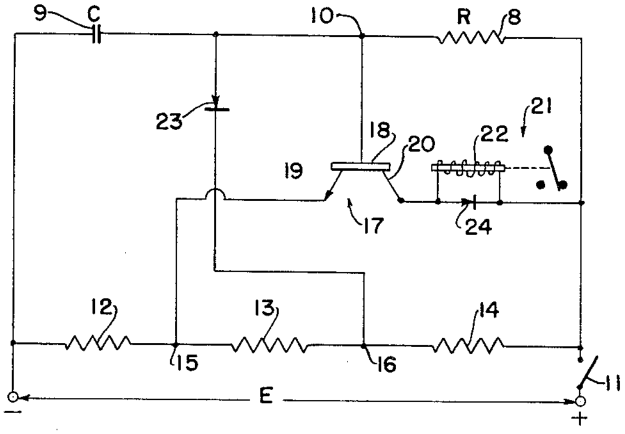

The invention may be best understood by referring to the following drawings in which:

FIG. 1 is a schematic diagram of a timing circuit in accordance with the invention; and FIGS. 2, 3, 4, 5, and 6 are schematic diagrams illustrating timing circuits in accordance with the invention and alternative to that of FIG. 1.

Referring to FIG. 1 the timing circuit comprises a resistor 8, having the value R, and a capacitor 9, having the value C, connected as an R-C series circuit and having a connection point 10 therebetween. A voltage source producing a voltage E is connected across the series circuit with the polarity shown. The voltage is applied to the series circuit by means of a switch 11. A voltage divider network comprising three series-connected resistors 12, 13, 14 is connected across the R-C series circuit and voltage source.

When the voltage E is switched across the series R-C circuit at the time $t=0$, the voltage across the capacitor 9 is equal to zero. However, as the capacitor charges, the voltage thereacross is given by the equation:

$$\text{Voltage across } C=E(1-e^{-t/RC})$$

where: the term RC is defined as the time constant of the R-C series circuit.

Since one end of the capacitor 9 is maintained at a constant negative potential the equation actually defines the variation in voltage with time at the connection point 10. The resistors 12, 13, 14 are employed to divide the voltage E so that a constant potential appears at the connection point 15 having a value defined by the selected values of the resistors. Thus there exists a voltage difference between the point 10 and the point 15 which varies with time.

The circuit of FIG. 1 further includes a switching amplifier comprising a transistor 17 having a base electrode 18, an emitter electrode 19, and a collector electrode 20. The input circuit of the amplifier includes the base electrode 18 which is connected to point 10, and the emitter electrode 19 which is connected to point 15. In this way the input circuit senses the varying voltage difference between the points 10 and 15. Since the point 15 is at a more positive potential than the point 10 at the time $t=0$, the n-p-n transistor shown is initially reverse biased and the amplifier is cut off. As the capacitor 9 becomes charged, the voltage at point 10 becomes more positive until it equals the voltage at point 15. At that time the transistor becomes forward biased and current flows into the base electrode 18. This instantaneously causes an increase in the voltage drop through resistor 8 greater than previously exhibited, which in turn causes the capacitor 9 to charge until the circuit reaches a steady state condition. Such condition is reached when the current through resistor 8 is equal to the voltage drop across resistors 13 and 14 divided by the resistance of resistor 8 plus the input impedance Z of the transistor 17. This analysis justifiably assumes that the values of resistors 13 and 14 are quite small compared to the values of resistor 8 and impedance Z.

The steady state current thus produced will be amplified by the transistor to provide a current $I_0$ at the collector electrode 20 equal to $\beta I_{ss}$.

where:

$I_{ss}$=the steady state current through resistor 8, and
$\beta$=the common emitter current gain of the transistor 17.

The output current $I_0$ is connected to the load which is to be initiated into operation. In the illustrated embodiment this load is a relay 21 having its operating coil 22 connected to the collector electrode 20 and to the positive end of the voltage source E.

It is thus seen that the timing circuit of FIG. 1 may be employed to initiate a selected load into operation after the elapse of a determinable time interval. This time interval is determined by the delay between the time the voltage E is applied to the circuit until the time the capacitor 9 charges sufficiently to reverse the bias of the transistor 17. Such delay is in turn determined by the value of the time constant RC and the value of the reference potential at the point 15.

The hereinbefore recited advantages of the improved timing circuit should now be more clearly understood. It can be seen, for example, that the timing accuracy of the circuit is dependent only upon the stability of the resistance 8 and the capacitor 9, and the accuracy of the voltage E during the timing interval. Or, that the voltage E may have any value so long as it is high enough to operate the load and not so high as to damage the circuit elements. This is due to the fact that the timing interval will not change with the applied voltage unless the voltage change occurs during the passage of a particular timing interval and even then the timing interval will not vary by any substantial amount unless the change in the applied voltage is relatively large. It can also be seen that the transistor is held cut off by a reverse bias and abruptly switches to a heavy forward input current. This makes transistor variations due to temperature effects essentially negligible so far as circuit operation is concerned. In addition, it can be seen that the timing interval may be selected by simply making either resistor 8 or capacitor 9 variable.

The improved timing circuit also lends itself to substantially instantaneously reset after the elapse of a selected timing interval. Diodes 23 and 24 are employed for this purpose. The output load 21 will remain operative so long as the voltage E is applied to the circuit. When the voltage E is removed by opening switch 11, the diode 24 prevents the inductive "kick" voltage in relay coil 22 from exceeding a safe limit. The rectifier diode 23 serves to discharge the capacitor 9 through resistors 12 and 13 to rapidly reset the point 10 to its initial value. The reset time may be varied by an appropriate selection of the value of resistor 13. The point 16 must, however, be at a potential more positive than that of point 15 during the timing interval in order to cut off the diode 23 and prevent current flow therethrough.

The circuit of FIG. 1 is quite adequate in a situation where the value of the resistor 8 is low enough, or the load sensitive enough so that high current gain is not required.

Figures 2, 3:
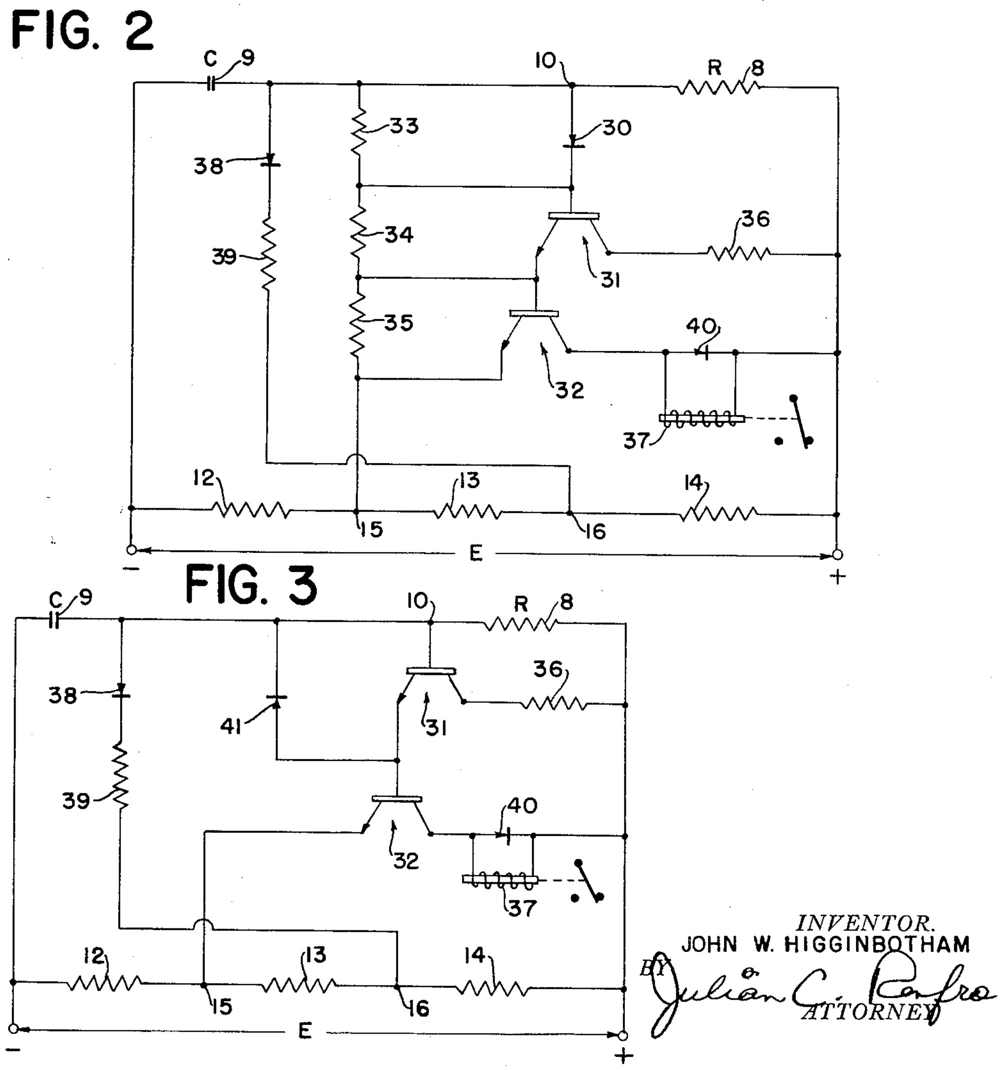

FIG. 2 illustrates a timing circuit essentially similar to that of FIG. 1 but with certain modifications which provide greater current gain. The circuit again includes the R-C series network comprising resistor 8 and capacitor 9, the voltage source E, and the voltage dividing resistors 12, 13, and 14. The switching amplifier is now different, however. It comprises a diode 30, and a pair of transistors 31 and 32. The diode has its plate connected to point 10 and its cathode connected to the base electrode of transistor 31. The emitter electrode of transistor 31 is connected to the base electrode of transistor 32. The emitter electrode of transistor 32 is in turn connected to point 15. Thus the voltage difference between points 10 and 15 is applied across the combination of diode 30 and transistors 31 and 32, which combination serves as the input circuit of the amplifier.

A high resistance voltage divider circuit consisting of resistors 33, 34, and 35 is connected in parallel with the series combination between points 10 and 15. Voltage differences can thus be tapped off the divider network and applied across the base and emitter electrodes of the transistors. In this way any preselected value of voltage difference can be employed to safely reverse bias each of the elements of the series input circuit. This method of providing reverse bias enables transistors with low inverse base to emitter voltages to be employed in the input circuit. In addition, such biasing will provide practically zero leakage (collector cutoff currents) even at high temperatures. It should be noted that diode 30 and resistor 33 may be eliminated and a direct connection to point 10 substituted. In that event the inverse bias would be divided in any permissible ratio between the transistors 31 and 32.

In operation the diode and transistors of the input circuit will be reverse biased when the potential at point 10 is less than the potential at point 15. When the capacitor 9 is charged so that the potential at point 10 exceeds the potential at point 15, the diode and transistors of the input circuit will be forward biased and current will flow into the base element of transistor 31. A steady state current is then reached when the current through resistor 8 is equal to the voltage drop across resistors 13 and 14, divided by the value of resistor 8 plus the input impedance Z exhibited by transistor 31. To amplify this steady state current the collector electrode of transistor 31 is connected through a resistance 36 to the positive end of the voltage source E. The collector electrode of transistor 32 is connected through the output load, in this case relay coil 37, to the positive end of the voltage source E. In this way the output current $I_0$ through the coil 37 is cascade amplified to the value $I_{ss}(\beta)(\beta'+1)$, where:

$I_{ss}$=the steady state current through resistance 8,
$\beta$=the common emitter current gain of transistor 32, and
$\beta'$=the common emitter current gain of transistor 31.

Thus the circuit of FIG. 2 provides a higher current gain than does the circuit of FIG. 1.

In order to reset the timing circuit of FIG. 2 after the elapse of a selected time interval, the circuit is provided with a diode 38 and a resistor 39 connected in a series circuit between the points 10 and 16. In addition, the circuit is provided with a diode 40 connected across the relay coil 37. The diode 40 is employed to prevent a dangerously high inductive "kick" voltage in the relay coil. The series combination of diode 38 and resistor 39 is employed to discharge the capacitor 9. In this case the resistor 39 can be varied to select the desired reset time.

The circuit of FIG. 3 is essentially similar to the circuit of FIG. 2 except in the manner of applying the reverse bias to the elements of the input circuit. Similar components are identically numbered. In FIG. 3 the transistor 31 is connected directly to the point 10 and the diode 30 is eliminated. The connection joining the emitter electrode of transistor 31 to the base electrode of transistor 32 is electrically connected through a diode 41 back to point 10. The diode plate is connected to the emitter electrode and the diode cathode is connected to point 10. In this way the direction of the diode is such as to short-circuit the by-passed transistor 31 while the capacitor 9 is being charged. Thus almost all the reverse bias is applied across transistor 32. However, when the capacitor charges to a value slightly greater than the potential at point 15, the diode 41 becomes cut off and the current $I_{ss}$ flows through transistor 31 as in the previously described circuits. Such a bias configuration is advantageous when the applied voltage is so small as to necessitate an application of essentially the entire voltage across one of the transistors in order to cut off the amplifier input.

Figure 4:
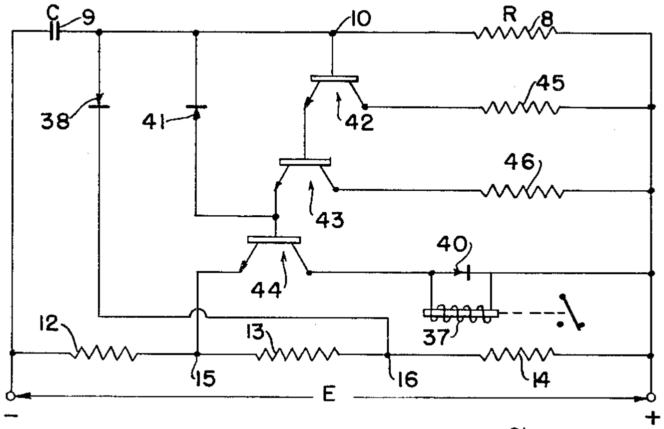

If the value of resistor 8 is increased to give a long timing interval for a given value of capacitor 9, or if a lower sensitivity load is employed, it may be necessary to even further increase the current gain of the relay circuit illustrated in FIG. 2. In that event the number of transistors may be increased and connected to cascade amplify the current $I_{SS}$. Such a configuration is illustrated in FIG. 4. The reverse biasing connection in FIG. 4 is similar to that employed in FIG. 3. It should be noted that the described variations in reverse bias application may be interchangeably employed in any of the illustrated circuits.

Figures 5, 6:
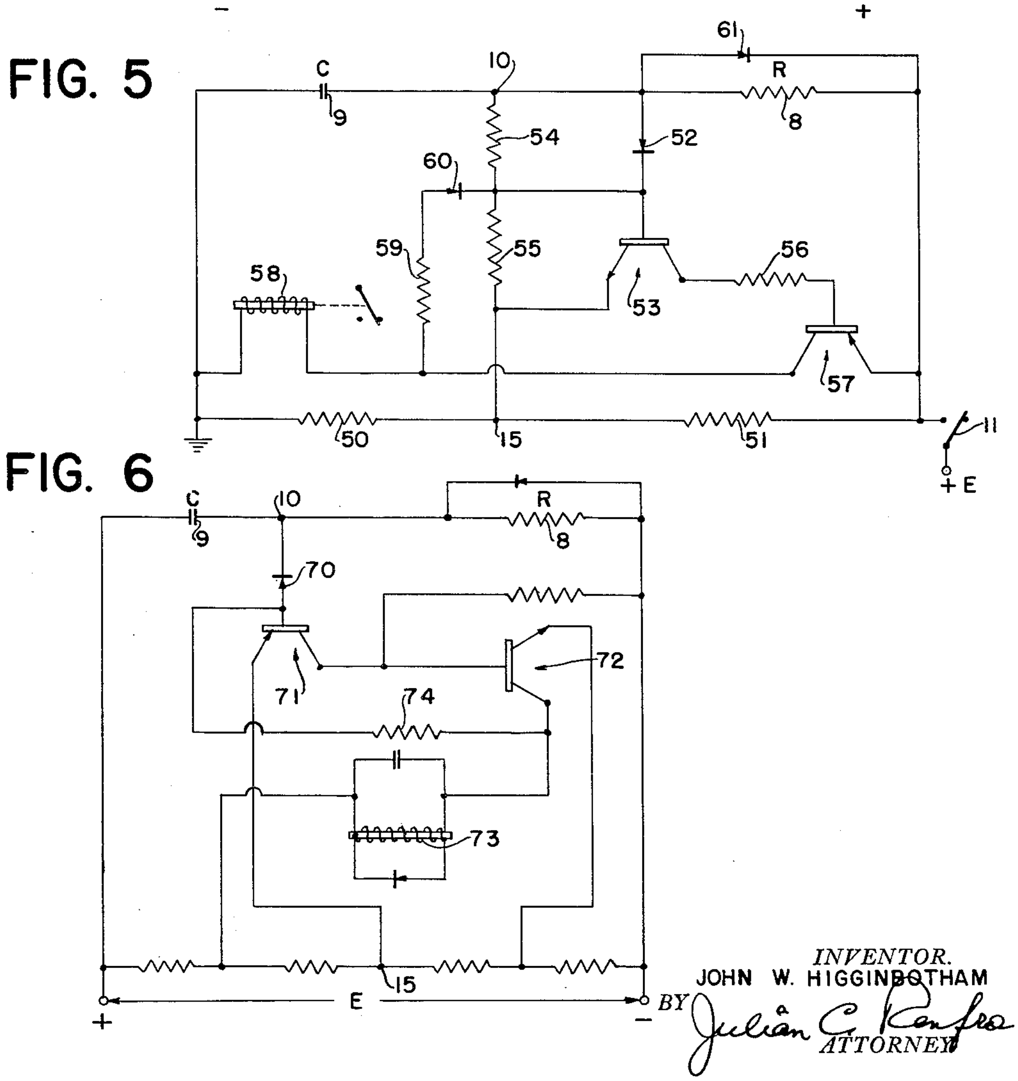

The circuit of FIG. 5 employs regeneration in its switching amplifier to provide an even higher current gain than does the circuit of FIG. 4. Only two resistors, 50 and 51, are employed in the voltage divider network to provide the preselected reference potential at point 15. The input circuit of the switching amplifier now comprises diode 52 and transistor 53 connected between the points 10 and 15 to sense the voltage difference therebetween. The plate of the diode is connected to point 10 while its cathode is connected to the base electrode of transistor 53. The emitter electrode of the transistor 53 is connected to point 15. A biasing voltage divider network comprising resistors 54 and 55 is connected across the input circuit.

The input circuit operates in the same manner as do those in the previously described circuits. When diode 52 begins conduction, transistor 53 amplifies the steady state current through resistor 8 by an amplification factor $\beta 1$. In this case, however, the amplified current is fed out of the collector electrode of transistor 53 through a resistor 56 to the base electrode of another transistor 57. Transistor 57 has its emitter electrode connected to the positive side of the voltage source E and its collector electrode connected to the negative side of voltage source E through an output load, relay coil 58. In this way transistor 57 further amplifies the steady state current by an amplification factor $\beta 2$ giving an output current $I_0$ through the relay coil 58 equal to $I_{SS}\beta 1\beta 2$. The combination of an n-p-n and a p-n-p transistor is employed in this amplifier circuit.

In addition, a regenerative action takes place through a feedback network comprising resistor 59 and diode 60, and connecting the collector current output of transistor 57 to the base electrode of transistor 53. The diode 60 is normally biased to cutoff. However, when the current $I_0$ raises the voltage across the relay coil 58 to a value greater than that at the base electrode of transistor 53, the diode 60 becomes forward biased. As a result more current is fed into transistor 53 which further increases the current through the relay coil. This regenerative action continues until the full voltage E is applied across relay coil 58. Resetting of capacitor 9 is effected through diode 61.

With regeneration the current gain of the switching amplifier is increased without decreasing the value of the resistance 8. This is due to the fact that current through resistor 8 is employed only to initiate the amplifier into operation while most of the current required to operate the output load comes from the regenerative action. In addition, the regenerative action provides accelerated switching over that of the circuits previously described in that the total switching time has only a third-order dependence on the applied voltage E and the characteristics of the output load.

In the circuit of FIG. 6 the polarity of the voltage source E is reversed so that its positive end is now on the capacitative side of the series R-C circuit. Thus the potential at point 10 will decrease in a negative direction after the voltage E is applied to the circuit. The changes in FIG. 6 over the previous circuits flow logically from this polarity reversal.

The input circuit again comprises a diode 70 and a transistor 71 connected across points 10 and 15 to sense the voltage difference therebetween. Since point 10 is initially more positive than point 15 the cathode of diode 70 is connected to point 10 in order for the diode to be initially reverse biased. The anode of diode 70 is connected to the base electrode of transistor 71. The input circuit is completed by connecting the emitter electrode of transistor 71 to point 15. Transistor 71 is now of the p-n-p type rather than of the n-p-n type employed in the previous circuits so that the voltage difference across points 10 and 15 will initially produce a reverse bias.

When the potential at point 10 becomes more negative than the potential at point 15, the diode 70 and transistor 71 become forward biased and a steady state current flows through the transistor 71, diode 70, and resistor 8. This steady state current is amplified by the transistor 71 and is then applied to the base electrode of n-p-n transistor 72. The transistor 72 further produces amplification and applies an output current $I_0$ through the output load, relay coil 73. Regeneration is employed in this switching amplifier, as in FIG. 5, through a feedback resistor 74 connecting the collector electrode of transistor 72 to the base electrode of transistor 71.

Preferred embodiments of the invention have been described. Various changes and modifications may be made in the scope of the invention as set forth in the appended claims.

Reverse bias is applied to the base of transistor 71 through the load 73 and resistor 74. Reverse bias is applied to the base of transistor 72 through the resistor to the negative connection of the voltage E.

I claim:

1. An electrical switching circuit for activating an output load at a pre-selected time after the application of a voltage to the circuit, comprising:
   *a.* a resistor and a capacitor connected as a series circuit, a first connection point in said series circuit between said resistor and said capacitor;
   *b.* means for applying a voltage across said series circuit whereby there is developed at said first connection point a potential which varies in time as a function of the time constant of said series circuit;
   *c.* a voltage divider network connected across said voltage means and said series circuit, a second connection point in said voltage divider network for tapping a pre-selected constant potential therefrom;
   *d.* first and second transistors;
   *e.* the input circuit of said first transistor comprising the base electrode and one other electrode, a rectifier connected between said base electrode and said first connection point, said rectifier being connected so as to be reverse biased when the voltage at said first connection point is below pre-selected level and to be forward biased when the voltage at said first connection point is above said pre-selected level, said other electrode of said first transistor being connected to said second connection point, whereby when the voltage at said first connection point reaches said pre-selected level, the voltage difference between said first and second connection points is applied across the input circuit of said first transistor, putting said first transistor into conduction;
   *f.* the output circuit of said first transistor being connected to the input circuit of said second transistor so that said second transistor amplifies the current output of said first transistor;
   *g.* an output load in the output circuit of said second transistor;
   *h.* a positive feedback circuit connected between the output circuit of said second transistor and the input circuit of said first transistor;
   *i.* first and second biasing networks corresponding to said first and second transistors, each said biasing network acting to cut off its corresponding transistor when the voltage at said first connection point is below the pre-selected level, each of said biasing networks being substantially independent of the potential at said first connection point when said potential is below said pre-selected level.

2. The electrical switching circuit of claim 1 in which the bias network for said first transistor comprises a series divider network connected between said first and second connection points and a connection between a point on said divider network and the base electrode of said first transistor.

3. The electrical switching circuit of claim 1 in which the bias for said first and second transistors comprises the connection of an element of each of said transistors to said voltage divider network.

References Cited in the file of this patent

UNITED STATES PATENTS

| | | |
|---|---|---|
| 2,480,678 | Skudre | Aug. 30, 1949 |
| 2,546,814 | Augustadt | Mar. 27, 1951 |
| 2,622,211 | Trent | Dec. 16, 1952 |
| 2,641,701 | Moore | June 9, 1953 |
| 2,644,895 | Lo | July 7, 1953 |
| 2,829,257 | Root | Apr. 1, 1958 |
| 2,840,727 | Guggi | June 24, 1958 |
| 2,845,548 | Silliman et al. | July 29, 1958 |
| 2,897,453 | Mansford | July 8, 1959 |
| 2,900,606 | Faulkner | Aug. 18, 1959 |
| 2,906,926 | Bauer | Sept. 29, 1959 |

FOREIGN PATENTS

| | | |
|---|---|---|
| 742,967 | Great Britain | Jan. 4, 1956 |
| 1,122,426 | France | May 22, 1956 |